Figure 1:
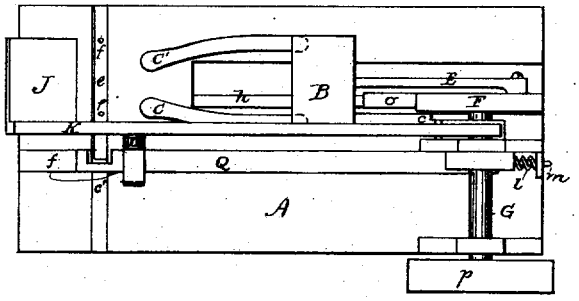

H. J. BATCHELDER.

Assignor, by mesne assignments, to himself and T. S. VERY.

Machine for Making Horseshoes.

No. 8,340. Reissued July 16, 1878.

Witnesses.
H. H. Sturtevant
L. M. Barton

Inventor.
H. J. Batchelder
by Wright & Brown
Attys.

N. PETERS, PHOTO-LITHOGRAPHER, WASHINGTON, D. C.

H. J. BATCHELDER.

Assignor, by mesne assignments, to himself and T. S. VERY.

Machine for Making Horseshoes.

No. 8,340. Reissued July 16, 1878.

Witnesses.
W. J. Storton
L. H. Barton.

Inventor.
H. J. Batchelder
by Wright & Brown
Attys.

N. PETERS, PHOTO-LITHOGRAPHER, WASHINGTON, D. C.

UNITED STATES PATENT OFFICE.

HAZEN J. BATCHELDER, OF MONTPELIER, VERMONT, ASSIGNOR, BY MESNE ASSIGNMENTS, TO HIMSELF AND THEODORE S. VERY.

IMPROVEMENT IN MACHINES FOR MAKING HORSESHOES.

Specification forming part of Letters Patent No. 180,448, dated August 1, 1876; Reissue No. 8,340, dated July 16, 1878; application filed May 13, 1878.

*To all whom it may concern:*

Be it known that I, HAZEN J. BATCHELDER, of Montpelier, in the county of Washington and State of Vermont, have invented certain new and useful Improvements in Horseshoe-Machines, of which the following is a specification:

The first part of my invention relates to horseshoe-machines in which the blank from which the shoe is made is cut from a bar of iron and bent into the required shape, and may be called an improvement on the invention for which Letters Patent were granted to myself and Theodore S. Very, December 21, 1875.

This part of my invention has for its object to render sundry operations in the formation of the shoe more effective and expeditious than by the said patented machine; and it consists in the peculiar construction, combination, and arrangement of the parts, whereby the desired results are attained.

The second part of my invention relates to horseshoe-machines in which the shoe or blank, after being bent into the proper shape, is subjected to the action of dies or punches, which form indentations or nail-holes in the shoe or blank.

Heretofore it has been the invariable custom, so far as I am aware, in forming punched nail-holes in horseshoes, to punch entirely through the shoe from one side, the punch or punches entering one side of the shoe and emerging from the other; and this is the case whether the shoe is punched in a machine or by an ordinary hand-operated punch. This method of forming nail-holes causes such a displacement of metal that protuberances are formed on the edges of the shoe, and burrs or fins projecting from the side of the shoe from which the punch emerges, this being the hoof-bearing or upper side. These protuberances and burrs or fins have to be reduced by subsequent hammering or pressing operations, which tend to partially fill up the nail-holes, so that the latter have to be repunched or pritcheled to adapt them to receive nails.

It will be seen, therefore, that shoes in which the nail-holes are punched through the shoe from one side have to undergo considerable manipulation after the punching operation before they are in condition to be applied to the hoof.

This second part of my invention has for its object to enable the nail-holes in a horseshoe to be punched without forming protuberances on the edges or projecting burrs or fins on the hoof-bearing surface or side.

To this end the invention consists in an arrangement of punches or dies and anvil and former in a horseshoe-machine, whereby two series of cavities are formed simultaneously, one on each side of the shoe, the cavities on one side coinciding with those on the other side, and being separated therefrom by thin intervening webs of metal, which may be punched through by a pritchel, to form the nail-holes without displacing the metal laterally. The burrs or fins formed by the last-named punching operation are entirely contained within the cavities in the side of the shoe from which the punch or pritchel emerges, said cavities preventing the burrs from projecting beyond the hoof-bearing surface of the shoe.

The invention also consists in the employment of hemmers in connection with said punches or dies, whereby the metal is prevented from being displaced laterally to a sufficient extent to form protuberances at the edges of the shoe.

The invention consists, finally, in the product of the machine employing the said punches or dies—viz., a shoe having coinciding cavities punched in its opposite sides, the cavities of one side being separated from those of the other side by their intervening webs, all of which I will now proceed to describe.

Figure 2:
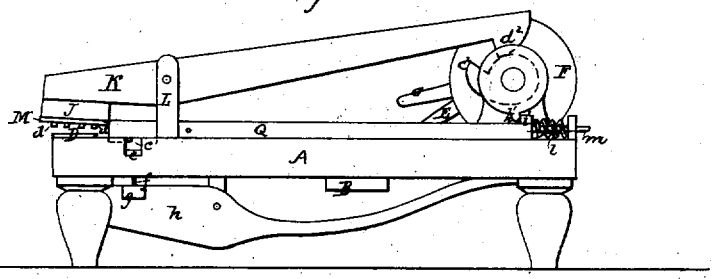
Figure 3:
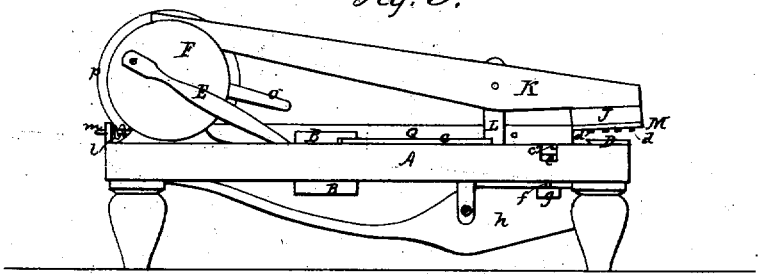
Figure 4:
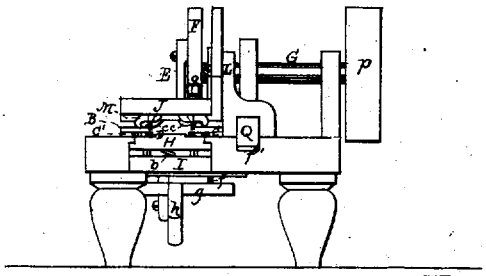
Figure 9:
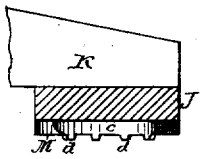
Figure 10:
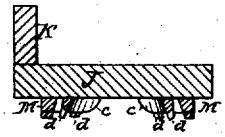
Figure 6:
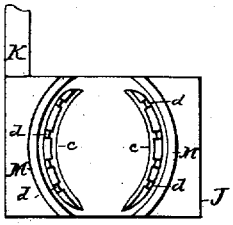
Figure 7:
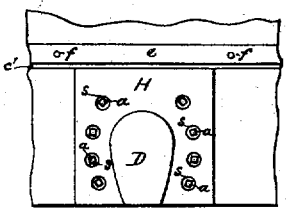
Figure 5:
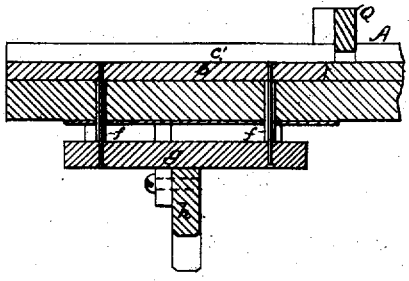
Figure 8:
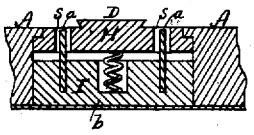
Figure 12:
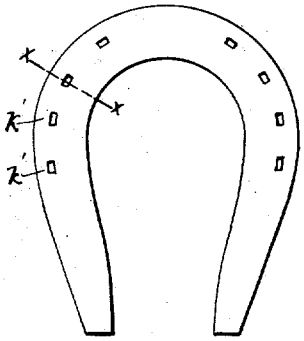
Figure 11:
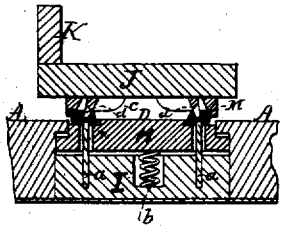
Figure 13:
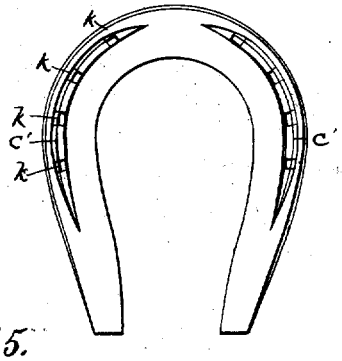
Figure 14:
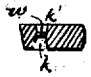
Figure 15:
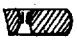

Of the accompanying drawings, forming a part of this specification, Figure 1 is a top view; Fig. 2, a side elevation, (the driving-pulley in this figure being removed in order to show the parts behind it.) Fig. 3 is an opposite-side elevation, and Fig. 4 a front-end elevation, of a machine embodying my improvements. Fig. 5 is a transverse and vertical section taken through the blank-raising bar. Fig. 6 is an under-side view of the creaser-carrier, showing the combined creasing and upper punching dies and the hemmers. Fig. 7 is a top view of that part of the machine carrying the anvil or block, to which the former is attached, and showing the lower set of punches, which project up through the same when the anvil is forced downward. Fig. 8 is a transverse section of the same. Figs. 9 and 10 are sections of Fig. 6 taken at right angles. Fig. 11 represents an enlarged sectional view, showing the shoe and the position of the dies while the cavities are being formed in the shoe. Fig. 12 represents a view of the upper or hoof bearing side of the shoe produced by my improved machine. Fig. 13 represents a view of the under side of the same. Fig. 14 represents a section on line *x x*, Fig. 12. Fig. 15 represents a similar section, showing the shoe after the nail-holes have been formed by punching through the webs.

In the drawing, A denotes the table or bed for supporting the main operating parts. B is a cross-head, affixed to the table so as to be capable of sliding longitudinally thereon. C C′ are the bending jaws or levers, having their rear ends pivoted to the cross-head B, their free ends being so shaped and guided as to cause them, when impelled forward, to bend the shoe-blank around the former or die D, which is located on the bed A, in the same relation to the bending-jaws as the former described in the above-named patent.

E is a pitman, which connects the cross-head with a wheel, F, disposed on one end of the driving-shaft G, which is arranged and supported in standards at the rear end of the machine, such shaft carrying on its opposite end a drum or pulley, *p*, to which rotary motion may be imparted by any suitable motor, such motion giving reciprocating rectilinear movements to the cross-head, and consequently to the bending jaws or levers C C′.

Near the front end of the bed or table, and extending transversely across the same, I form a rectangular groove or channel, *c′*, of a width and depth sufficient to admit the bar of iron or metal to form the horseshoe-blank, the object of this channel being to allow a bar of iron to be introduced into the machine at any time without interfering with the movements of the machine, and thus expedite the formation of the shoes. Within this channel is disposed a bar, *e*, capable of being moved vertically. Such bar is supported on pins *f f*, which extend down and rest upon a bar, *g*, supported on and near one end of a curved lever, *h*, which extends longitudinally of the bed, and is pivoted near one end to an arm extending down from the under face of the bed.

The mechanism for raising the bar *e* (the normal position of which is on a plane with the stationary part of the bottom of the bar-receiving groove) is a cam, *o*, disposed on the periphery of the wheel F, which impinges against the rear end of the said lever, the action of the cam being so timed with respect to the cutting-off mechanism as to raise the blank to the plane of the top of the table after it is severed, and present it to the action of the shaping-jaws, the gravitating force of the longer arm of such lever serving to restore the bar to its normal or first position.

The mechanism for cutting off the blank, and reducing the ends or parts to constitute the heel portions of the shoe, is to be the same as that described in the said patent of December 21, 1875, and therefore need not be described in detail, further than by stating that it is composed of a stationary shear-blade, attached to the bed or table, and a movable shear-blade, arranged to co-operate with the stationary blade, and attached to a bar, Q, the said bar reciprocating through the standard L.

*f′* is a groove formed in the front end of the bed, and at a right angle to the bar-receiving groove $c^1$, before mentioned, the object of the groove *f′* being to allow the movable shear free reciprocation in a plane below the top surface of the bed.

The mechanism for reciprocating the movable cutter or shear consists of the cam *h′*, disposed on the driving-shaft, which acts against a lug or ear, *i*, arranged at the rear end of the lever Q; a spring, *l*, coiled around a rod, *m*, arranged as shown in Fig. 1, serving to restore the lever to its normal position after the cam has ceased its action.

The shear-blades are arranged with their lower edges or surfaces on a level with the bottom of the recess or channel $c^1$. The stationary shear-blade is arranged at one side and out of the line of the channel $c^1$. The reciprocating shear-blade is arranged to cross the channel $c^1$, when moved toward the stationary blade by the cam *h′*, to cut the blank; but when the bar Q is released by said cam, the spring *l* forces the bar back, thus forcing the reciprocating cutter quickly out of the line of the channel $c^1$, leaving the latter unobstructed. Both movements of the reciprocating shear-blade are rapid, and occur in rapid succession, so that the channel $c^1$ is obstructed by said blade only a very small part of the time. The channel $c^1$ extends in both directions from the cutters—that is to say, outwardly to the edge of the table, and inwardly under and beyond the path over which the benders move.

The means for forming the coinciding cavities in the opposite sides of the shoe are as follows, viz: A series of rising and falling dies or punches, *d d*, located on the front end of the pivoted lever K, and a series of stationary punches, *a a*, located on the bed or table A, the punches of each series being arranged to coincide with those of the other series, each series being arranged so that it will form cavities in one side of a horseshoe interposed between the two series in the proper places for the nail-holes. The punches *d* are preferably located on creasing-dies *c*, which are attached to a creaser-carrier, J, in the lever K. The creasers are formed to impart two creases of the proper shape to one side of the shoe, and the dies *d* project below the planes of the edges of the creasers.

Disposed on the creaser-carrier, and at a short distance from the outer side of each creaser, and concentric, or nearly so, therewith, is what I term a "hemmer," M, the object of such being to form and preserve the outside of the shoe smooth, or, in other words, to prevent the dies $d$ and $a$ from displacing the metal laterally, and forming protuberances on the edges of the shoe when they enter the sides thereof.

The mechanism for imparting the downward movements to the creaser and its adjuncts consists of a cam, $c^2$, arranged on the driving-shaft, and another cam, $d^2$, formed on the outer end of the lever K, the gravitating force of the longer arm of the lever serving to elevate the creasers and dies $d$ after the cams have ceased their action, the object of this combination or arrangement of cams being to impart an instantaneous downward movement to the creasers and their adjuncts, so to cause them to remain in contact with the hot iron the minimum length of time.

The former D, around which the shoe is bent, is mounted upon an anvil or block, H, which is located within a recess in the bed A, said anvil having a series of vertical holes, $s$, into which the punches $a$ extend, the latter being inserted in a rigid block, I, disposed within the bed and below the former-carrier or anvil H. This anvil is so applied to the bed as to be movable vertically therein, and thereby allow the punches $a$ $a$ to project through the anvil the desired distance when the latter is depressed, a spring, $b$, disposed between the anvil and the block I, serving to restore the anvil to its normal position, with its upper surface flush with the upper surface of the bed A. The former is, by preference, made beveling around its entire edge, such bevel extending from the lower face upward, as shown in Fig. 4, the object of such formation being to widen the shoe on its lower or inner surface.

Having described the construction of my improved machine, its operation is as follows: If we suppose the parts to be in the position as shown in Figs. 1 and 2, the bar of metal to form the horseshoe-blank, having been duly heated, is to be introduced into the guide-channel $c^1$ until it abuts against a gage so adjusted as to give the required length to the blank to be cut.

By rotating the driving-shaft the bar will be severed from edge to edge and the ends reduced, as in my aforesaid patented machine. After the blank has been severed, the movable portion of the bottom of the channel $c^1$ (the bar $e$) is elevated by the action of the cam $o$ on the tail of lever $h$, so as to be flush with the top of the table, carrying the severed blank with it, and presenting it to the action of the forming-jaws C C′, the movements of which are duly timed with respect to the elevating-bar $e$, which moves forward the blank and bends the same around the former D. This having been effected, a further rotation of the driving-shaft forces down the front end of the lever K, and brings into action the creasing and punching mechanism as well as the hemmers. The descent of the end of the lever K causes the punches $d$ and creasers $c^1$ to enter and form cavities $k$ and creases $c$ in the upper side of the shoe as it lies against the former on the anvil H, and the pressure of the punches depresses the shoe with the anvil H, the supporting-spring $b$ yielding to allow such depression. The shoe is thus forced down onto the punches $a$, and the upper ends of the latter are caused to project above the surface of the anvil H, and enter and form cavities K′ in the under side of the shoe. The metal displaced by the punches $d$ $a$ is mainly compacted between the proximate ends of said punches, and forms thin webs $w$, which separate the cavities K and K′, as shown in Fig. 14. While the cavities K K′ are being formed the hemmers M confine the outer edge of the shoe, and prevent the slight lateral displacement of metal caused by the punches from forming protuberances on the edges of the shoe. The shoe thus produced is adapted to be provided with nail-holes by the pritchel or punch of the blacksmith, the only operation required to form the nail-holes being to perforate the webs $w$ by a pritchel of the proper size and shape, the pritchel entering the cavities K and emerging into the cavities K′. The burrs formed by the pritchel project into the cavities K′, which are of such depth that said burrs cannot project beyond the surface of the shoe, as shown in Fig. 15, and the burrs are so thin that the metal displaced is all contained in the burrs, so that no lateral protuberances are formed on the edges of the shoe. It will be seen, therefore, that the cavities K K′, formed and arranged as described, enable each nail-hole to be formed by a single punching operation without involving any other manipulation of the shoe, such as hammering down protuberances and burrs, and re-punching the holes to clear the same from the metal forced into them by said hammering. The holes formed are of uniform size throughout their length in consequence of the thinness of the webs $w$, instead of being made in tapering form, which is necessary when the punch has to pass through a greater thickness of metal.

After the cavities have been formed in the shoe the spring disposed under the former-carrier raises the latter, with the shoe, from contact with the lower set of punches, while the gravitating force of the longer arm of the lever K will raise the carrier and its adjuncts from the shoe, when it may be readily removed from the machine. The described relative arrangement of the channel $c^1$ and the cutting mechanism enables the bar from which the blanks are cut to be inserted into the recess at any time excepting when the cutters or the lifter are in operation, the channel $c^1$ being entirely unobstructed from end to end at all other times, so that the bar can be inserted at any time between the lifting of the last-severed blank and the cutting off of the next blank. This is due to the fact that the cutting mechanism is entirely removed from the line of the channel when not in operation, and that the channel is extended outwardly from the cutters to the edge of the table, as well as inwardly, so that the bar can rest on the bottom of the groove and project outwardly therefrom before it is cut.

I claim as my invention—

1. In a machine for making horseshoes, the recess $c^1$ in the bed of the machine, located below the plane of the benders, combined with the benders, the lifting device, the stationary cutter located at one side of said recess, and the horizontally-moving cutter working crosswise of the recess, and arranged to be entirely withdrawn therefrom excepting when cutting off a blank, said recess extending in both directions from the cutters, as set forth.

2. In a horseshoe-machine, the combination of the series of rising and falling punches *d*, the series of stationary punches *a*, the anvil H, and the former D, as set forth.

3. The combination of the anvil H, carrying the former D, and provided with the series of holes *s s*, and the block I, provided with the series of punches *a a*, with the creasing and punching dies *c d*, and the hemmers M M, substantially as and for the purpose set forth.

4. As an improved article of manufacture, a horseshoe provided on its opposite sides with coinciding cavities *k k'*, separated by intervening webs, as and for the purpose specified.

HAZEN J. BATCHELDER.

Witnesses:

EARL P. BATCHELDER,
MARANCY A. HOPKINS.